June 17, 1930.　　　　　F. S. CARR　　　　　1,765,052
SEPARABLE FASTENER
Filed July 22, 1925
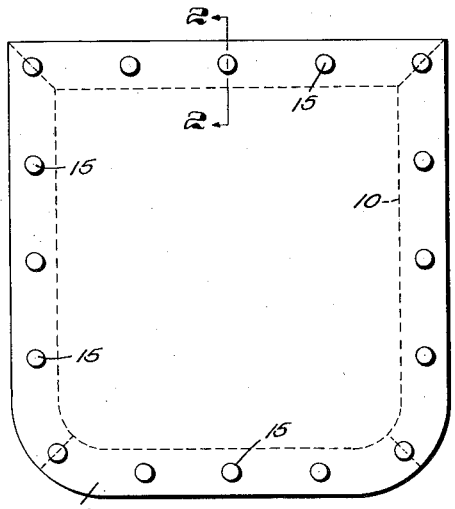
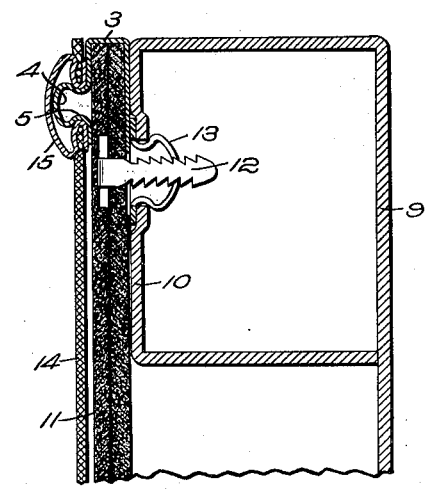
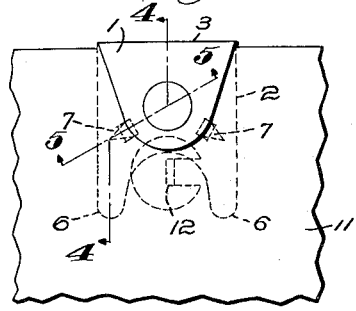
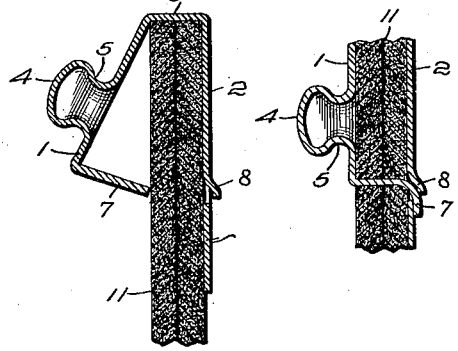
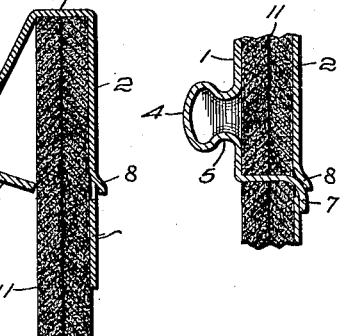
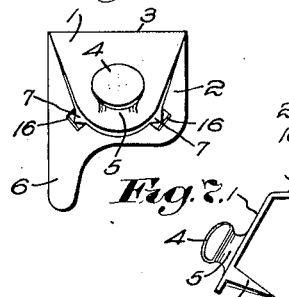
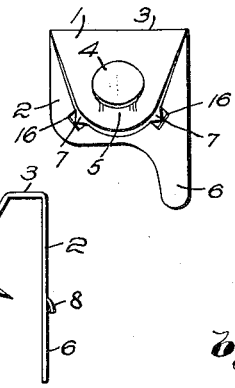
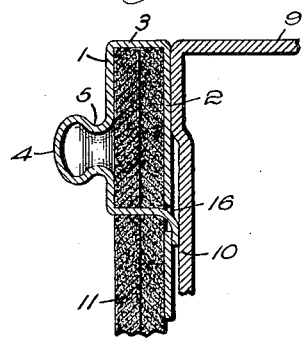
Inventor:
Fred S. Carr, Patented June 17, 1930

1,765,052

UNITED STATES PATENT OFFICE

FRED S. CARR, OF NEWTON, MASSACHUSETTS, ASSIGNOR, BY MESNE ASSIGNMENTS, TO UNITED-CARR FASTENER CORPORATION, OF CAMBRIDGE, MASSACHUSETTS, A CORPORATION OF MASSACHUSETTS

SEPARABLE FASTENER

Application filed July 22, 1925. Serial No. 45,272.

This invention aims to provide improvements in separable fasteners.

Reference is made to applicant's divisional application, Serial No. 140,481, filed October 9, 1926.

In the drawings, which illustrate preferred embodiments of my invention:—

Figure 1 is an inside elevation of an automobile door showing a slip cover secured thereto by a plurality of separable fasteners;

Fig. 2 is a section through the door on the line 2—2 of Fig. 1, being partly in elevation;

Fig. 3 is an enlarged view of a portion of the door showing a stud in position upon the upholstery part;

Fig. 4 is a section on the line 4—4 of Fig. 3;

Fig. 5 is a section on the line 5—5 of Fig. 3;

Figs. 6, 7 and 8 are elevation views of left and right hand alternative constructions of the stud; and Fig. 9 is a sectional view showing a modified form of fastening means for the clip portion of the stud member.

Referring to the drawings, I have illustrated a plurality of fastening elements which are particularly, though not exclusively, useful for securing slip covers to upholstery panels and the like.

The slip cover fastener elements, carried by the upholstery panel, are provided with means whereby they may be secured to the panel adjacent to the edge thereof without interfering with the fastening means used to secure the upholstery panel to the door or other frame member.

Referring to that form of slip cover fastening member illustrated in Figs. 1 through 5, I have shown a stud member having a clip-like base having an upper flange 1 and a lower flange 2 connected at one end by a flexible neck or hinge portion 3. The head 4 and neck 5 of the stud are pressed outwardly from the upper flange 1. The lower flange 2 is provided with two fingers 6, 6 spaced apart to permit adjustment of the stud, as a whole, relative to the upholstery panel as hereinafter more fully described. Attaching prongs 7 are formed from the upper flange 1 for securing the stud to a support and anvil portions 8 are presented by the lower flange 2 for upsetting and clinching the attaching prongs.

For purposes of illustration, I have shown, in the drawings, a sheet metal door 9 (Figs. 1 and 2) having a frame portion 10 to which is secured an upholstered panel 11 by fastening means including a male member 12 and female member 13 substantially as shown and described in a pending application of Moses F. Carr, Serial No. 747,232.

The slip cover 14 may be made of any suitable flexible material and has a plurality of suitable sockets 15 secured thereto adjacent to the edges thereof for cooperative engagement with the slip cover studs.

Assembly of the stud member with the panel 11 may be effected either before or after the panel is secured to the door frame 10 by engaging the clip-like base over the edge of the panel so that the neck or hinge portion 3 abuts against the edge of the panel and the lower flange 2 rests against the back face of the panel, as illustrated in Fig. 4. The upper flange is normally bent upwardly so that the ends of the prongs 7 may be spaced away from the lower flange so as not to interfere with the panel when the stud is being positioned relative thereto. After the stud is located upon the panel 11, the upper flange 2 may be clamped against the outer face of the panel to force the prongs through the panel and into engagement with the anvil portions 8 thereby to be bent outwardly through apertures in the lower flange 2 to overlie a portion of the lower flange, as illustrated in Fig. 5. Thus the stud member is securely fastened to the panel and cannot be easily separated therefrom by any outward pull exerted upon the head of the stud. After the panel 11 has been secured to the frame 10 with the slip cover studs positioned thereupon, the slip cover 14 may be secured to the studs by pressing the sockets 15 over the heads 4 of the studs, as illustrated in Fig. 2, thereby completing the installation.

In some instances, it is necessary to locate a slip cover stud upon the panel 11 directly, or very nearly so, over the fastening means for securing the panel 11 to the door 9, and as the fastening members 12 and 13 are located relatively close to the edge of the installation, the fingers 6, 6 are provided on the lower flange 2 so that they may span the male member 12. The fingers 6, 6 are spaced far enough apart so that the stud may be shifted to a limited extent relative to the male member before one of the fingers is brought into contact therewith. Thus the stud members may be positioned in any desired location upon the upholstery panel for cooperative engagement with the sockets secured to the slip cover.

The lower flange 2, including the fingers 6, 6, is made somewhat longer than the upper flange 1 so as to prevent a substantial portion of the clip-like portion between the panel 11 and the frame 10 to assist in preventing separation of the stud from the panel when outward strain is exerted thereupon.

The stud illustrated in Figs 6, 7 and 8 is substantially the same as shown in Figs. 1 through 5, except that the lower flange 2 is provided with only one finger. This finger may be at either the right or left hand side of the lower flange, as the case may be, and each serves its own purpose. In some instances it may be desirable to secure a stud to the panel 11 adjacent to the fastening means for securing the panel to the door, at either one side or the other, and therefore right and left-hand stud members are necessary to accomplish the desired result.

The stud shown in Fig. 9 is the same as that shown in Figs. 1 through 5, except that the attaching prongs 7 pass through apertures 16 in the lower flange 2 and are upset by the underlying frame portion 10 of the door 9.

While I have shown and described preferred embodiments of my invention, it will be understood that changes involving omission, substitution, alteration and reversal of parts and even changes in the mode of operation may be made without departing from the scope of my invention, which is best defined in the following claims.

I claim:

1. A one-piece fastener stud including a clip portion having upper and lower flanges secured together at one end to provide a hinge portion, a head and neck portion presented by the upper flange, a plurality of attaching prongs extending toward said lower flange from said upper flange, and cooperating apertures in said lower flange through which said prongs may pass.

2. A one-piece fastener stud including a clip portion having upper and lower flanges secured together at one end to provide a hinge portion, a head and neck portion presented by the upper flange, a plurality of attaching prongs extending toward said lower flange from said upper flange, and cooperating anvil portions formed in said lower flange for upsetting said prongs.

3. A one-piece fastener stud having a base portion clamped against both faces and the edge of a support, a head and neck portion extending outwardly from said base and a plurality of attaching prongs extending from one side of said base through the support and through the other side of said base, said prongs being upset after passing through said base.

4. A one-piece fastener stud having a base portion clamped against both faces and the edge of a support, a head and neck portion extending outwardly from said base and a plurality of attaching prongs extending from one side of said base through the support and the other side of the base and bent outwardly and downwardly against the base to secure said stud in fixed relation with the support.

5. A separable fastener element pressed from a single piece of metal and including a clip portion having upper and lower flanges, a separable fastening member provided as an integral part of the upper flange portion, a pair of fingers forming part of the lower flange and a plurality of prongs pressed from said upper flange, said prongs being adapted to pierce a support and prevent accidental displacement of the fastener element.

6. A one-piece slip cover stud member for attachment to the part to be covered by a slip cover, said stud member including a pressed metal head, neck and base, and attaching means connected with said base at one side thereof by a hinge portion to permit movement of said base toward and away from said attaching means and said attaching means having fingers extending in spaced relation to the base of the stud member, whereby the base of the stud member and attaching means and hinge portion form a U between which the material of the part to which the stud member is to be attached may be gripped.

7. A one-piece slip cover stud member for attachment to the part to be covered by a slip cover, said stud member including a pressed metal head, neck and base, and attaching means connected with said base at one side thereof by a hinge portion to permit movement of said base toward and away from said attaching means and said attaching means having fingers extending in spaced relation to the base of the stud member, whereby the base of the stud member and attaching means and hinge portion form a U between which the material of the part to which the stud member is to be attached may be gripped and one or more prongs or spurs integral with and extending from said base to provide means for preventing accidental displacement of said stud member.

8. A one-piece fastener stamped to provide a shank, a neck a continuation of the shank, a snap head a continuation of the neck and paralleling said shank for yieldable movements toward and away from the shank, and a ball formed integral with the head.

9. A fastener formed from a single piece of material to provide a shank, a head yieldably connected to and paralleling the shank, and a ball struck laterally and centrally of the head.

In testimony whereof, I have signed my name to this specification.

FRED S. CARR.